United States Patent

[11] 3,618,055

[72] Inventors Paul Antonius Ferdinand Van Acker; Wilhelmus Petrus Antonius Joosen; Johan Adriaan Rietdijk, all of Emmasingel, Eindhoven, Netherlands

[21] Appl. No. 854,157

[22] Filed Aug. 29, 1969

[45] Patented Nov. 2, 1971

[73] Assignee U.S. Philips Corporation New York, N.Y.

[32] Priority Aug. 31, 1968

[33] Netherlands

[31] 6812450

[54] FLEXIBLE DISC MAGNETIC MEMORY SURROUNDED BY A PERFORATED DRUM

7 Claims, 3 Drawing Figs.

[52] U.S. Cl. .................................................. 340/174.1E, 179/100.2 A

[51] Int. Cl. .................................................. G11b 1/00

[50] Field of Search .......................................... 179/100.2 MI, 100.2 P, 100.2 A; 340/174.1 E, 174.1 C

[56] References Cited

UNITED STATES PATENTS

| | | | |
|---|---|---|---|
| 2,751,274 | 6/1956 | Andrews | 340/174.1 |
| 2,811,709 | 10/1957 | Haselron et al. | 340/174.1 |
| 3,225,338 | 12/1965 | Kelner et al. | 340/174.1 |
| 3,471,843 | 10/1969 | Libman | 340/174.1 |
| 3,509,553 | 5/1970 | Krijnen | 340/174.1 |

*Primary Examiner*—Terrell W. Fears
*Assistant Examiner*—Vincent P. Canney
*Attorney*—Frank R. Trifari

ABSTRACT: A magnetic flexible disc memory where the discs are mounted on a rotatable shaft and are provided with apertures in their central areas. The rotating discs are surrounded by a perforated drum-shaped enclosure in order to provide a mechanical stabilization to the outer edges of the discs without the necessity for operation in a partial vacuum.

Figure 1:
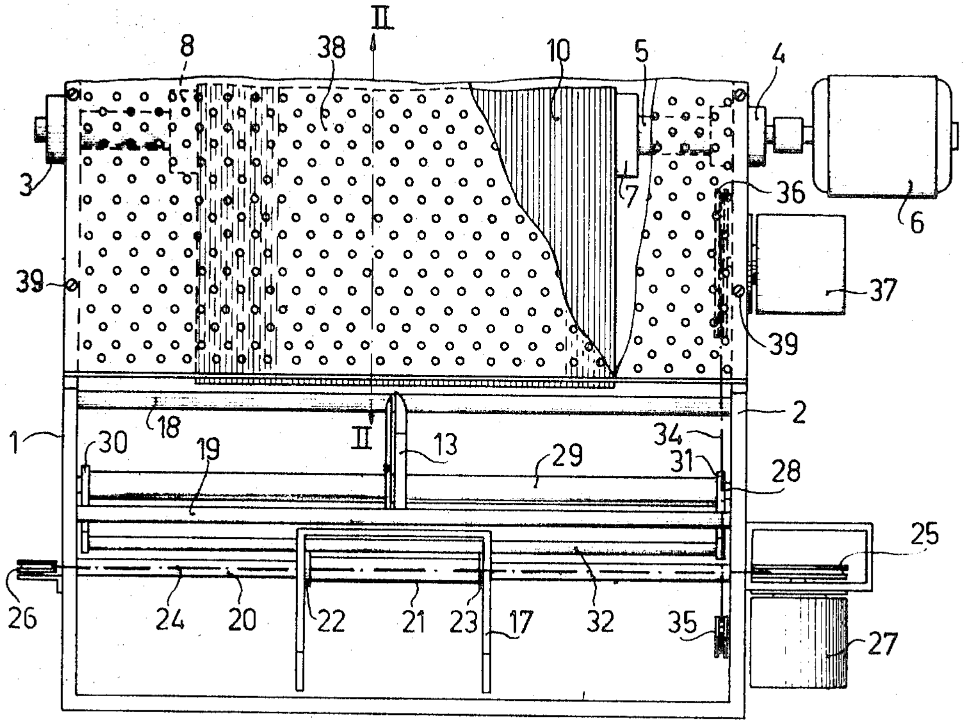

INVENTOR.
SAUL A. F. VAN ACKER
PETRUS A. JOOSEN
JOHAN ADRIAAN
BY Frank R. Jufari
AGENT INVENTOR.
SAUL A. F. VAN ACKER
PETRUS A. JOOSEN
JOHAN ADRIAAN
BY [signature] AGENT

FLEXIBLE DISC MAGNETIC MEMORY SURROUNDED BY A PERFORATED DRUM

The invention relates to an apparatus for recording and/or reproducing magnetic recordings, which apparatus includes a plurality of flexible recording discs which are coated with a magnetizable material and are mounted within an enclosure on a rotatable shaft so as to be spaced from one another and are provided with apertures in their central areas. At least one read and/or write head being provided which is displaceable both axially and radially by means of a positioning mechanism.

An apparatus of this kind is known from the Austrian Pat. No. 257,988. In this known apparatus, in order to obtain a large information storage capacity in a restricted space and comparatively short access times, the discs are arranged on the shaft with mutual spacings smaller than the largest dimension of the read/write heads measured in the direction of the axis. The set of flexible recording discs, in which during rotation there occur axial inflow of air through the apertures in the discs and radial outflow between the discs, is arranged in a casing in which a partial vacuum is maintained to ensure a stable rotational position of the discs with constant spacings and to prevent the discs from engaging one another along their edges. In order to enable a reduced pressure to be maintained in the casing, the latter, which is coupled to a vacuum pump, must be hermetically sealed and furthermore, for example, the shaft bearings must be sealed, with the resulting disadvantage that the known apparatus is comparatively complicated and expensive.

It is an object of the invention to obviate the said disadvantage, and for this purpose the invention is characterized in that the enclosure takes the form of a drum surrounding the recording discs substantially concentrically and with some clearance and being made of a perforated material.

The measures according to the invention, which is based on the recognition that the amount of air radially flowing out between the rotating discs is one of the factors which influence the stability of the discs, ensure that the apparatus can be operated under atmospheric pressure, by controlling the resistance to said airflow eliminating the necessity of casing a reduced pressure.

In an embodiment of the invention the drum is fixed and is provided with at least one axially extending slot for the passage of the head or heads. The drum concentrically surrounding the discs preferably takes the form of a cylinder of revolution.

Another suitable embodiment of the invention consists in that the drum also encloses the read/write head and the positioning mechanism. In this embodiment the drum may be fixed or rotatable.

According to the invention, the clearance between the drum and the discs preferably is substantially equal to the mutual spacing of the discs.

In order to prevent edge effects which may occur under certain conditions and may adversely affect the stability of a few of the first and of the last ones of the discs, in a preferred embodiment of the invention at least the ends of the drum which concentrically surrounds the discs have diameters which decrease towards the end faces of the drum. The effect attained by this step is also obtainable in an embodiment in which according to the invention the rate of perforation of the drum decreases towards the ends thereof. The term "rate of perforation" as used hereinafter refers to the ratio in a given area of the drum between the perforated area and the remaining nonperforated material of the drum surface.

Figure 2:
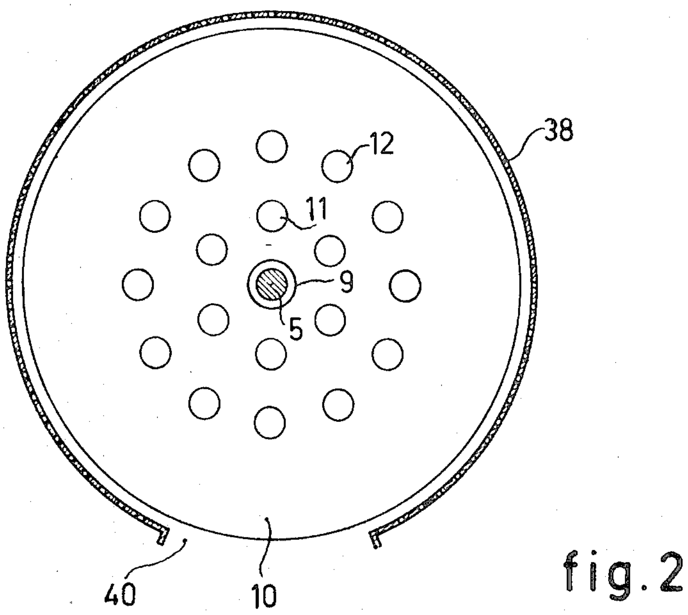
Figure 3:
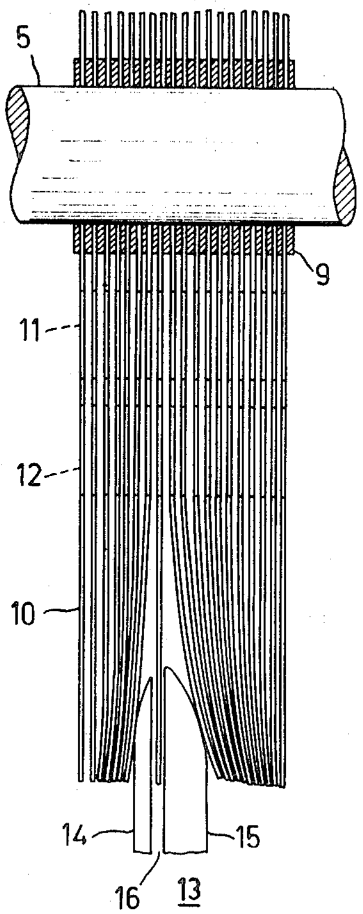

An embodiment of an apparatus according to the invention will now be described more fully with reference to the accompanying drawings, in which:

FIG. 1 is a top plan view of an apparatus according to the invention for recording and/or reproducing magnetic recordings, FIG. 2 is a cross-sectional view of the apparatus taken along the line II—II of FIG. 1, and FIG. 3 shows, to an enlarged scale, a detail of the apparatus shown in FIGS. 1 and 2, in which a read/write head is in an operative position between the flexible discs.

Referring now to the Figures, there is shown an apparatus for recording and/or reproducing magnetic recordings, which comprises a frame 1, 2 in which a shaft 5 arranged to be driven by a motor 6 is journaled by means of bearings 3, 4. A plurality of flexible recording discs 10 are clamped on the shaft 5 between clamping nuts 7, 8 and are spaced from one another by rings 9. In the embodiment shown, the spacing between adjacent discs is of the order of 2 mm. In the central area of each of the foillike recording discs 10, which are coated with a magnetizable material on one or both sides, there are made two circles of apertures 11, 12, the apertures of the various discs being aligned.

There is provided at least one read and/or write head 13, which comprises a supporting member 14 and a member 15 carrying the read and write element proper, a gap 16 being formed between these members. The head 13 is displaceable both in the axial and in the radial direction by means of a positioning mechanism which will now be described. The head is supported by a U-shaped bracket 17, which is axially displaceable between guide rods 18, 19, 20. The rod 20 is partly surrounded by a sleeve 21 having end flanges 22, 23 which engage the limbs of the bracket 17. To the flanges 22, 23 there is secured a cord or belt 24 which runs over pulleys 25, 26, the pulley 25 being adapted to be driven by a stepping motor 27.

A sleeve 29 rotatably surrounds a rod 28 rigidly secured to the frame 1, 2 and at its ends carries arms 30, 31 which carry a driving rod 32 which passes through two holes in the limbs of the bracket 17. Over a pulley 35 mounted for rotation in the frame part 2 and over a pulley 36 adapted to be driven by a stepping motor 37 there runs a cord or belt 34, which in a manner not shown is so coupled with the arm 31 that on movement of the belt 34 the sleeve 29 and the arms 30, 31 are rotated with respect to the rod 28, enabling the rod 32 to move the bracket 17 and the read and write head 1 in the radial direction.

The flexible recording discs are arranged within an enclosure 38 in the form of a drum which is made of a perforated material and surrounds the discs with a certain amount of clearance and substantially concentrically. In the embodiment shown, the drum takes the form of a cylinder of revolution and is secured to the frame by means of bolts 39 and is provided with an axially extending slot 49 for the passage of the head 13. The clearance between the drum and the discs is substantially equal to the mutual spacing of the discs. The invention is not restricted to the fixed arrangement of the drum shown and to the provision of a gap in the drum. Depending upon the construction of the head and of the positioning mechanism the invention also includes embodiments in which a fixed or rotatable drum also encloses the head and the positioning mechanism.

In certain cases, it may be desirable for the drum to have a diameter which decreases towards its end faces and/or for the rate of perforation of the drum material to decrease towards the drum ends in order to prevent the occurrence of edge effects which may adversely affect the stability of a few discs at both extremities of the set of discs.

By way of illustration, it should be mentioned that it has been found that stable rotation of the discs, in air of atmospheric pressure is obtained in an apparatus provided with a fixed cylindrical drum having a rate of perforation of about 20 percent, with a diameter of the discs of 30 cm, a disc spacing of 2 mm. and a number of revolutions of 1,500 per minute. It should be remarked that the rate of perforation of the drum is not particularly critical, i.e. it may vary within a range of from 10 to 30 percent without impairing satisfactory operation of the apparatus under the above-mentioned conditions. Operation of the discs at the aforesaid rate of revolutions with a drum having a rate of perforation substantially outside the range of from 10 to 30 percent generally results in peripheral instability of the discs.

What is claimed is:

1. A magnetic recording and reproducing apparatus comprising a rotatable shaft, a plurality of flexible magnetic recording discs mounted in spaced relationship on the shaft, the discs having apertures in the central portions thereof, magnetic read and write head means displaceable radially from the shaft and parallel to the shaft for magnetically recording and interrogating selected portions of a disc, means for positioning the head means with respect to the discs, and a drum made of a perforated material having a rate of perforation in the range of approximately 10 to 30 percent surrounding the recording discs substantially concentrically and spaced from the recording discs, whereby the discs may be rotated at atmospheric pressure without lateral instability in the periphery of the discs.

2. An apparatus as claimed in claim 1 wherein the drum is fixed and is provided with at least one axially extending slot for the passage of the head or heads.

3. An apparatus as claimed in claim 1, wherein the drum also encloses the read/write head and the positioning means.

4. An apparatus as claimed in claim 1, wherein the rate of perforation of the drum decreases towards the drum ends.

5. An apparatus as claimed in claim 4, wherein the clearance between the drum and the discs is substantially equal to the mutual spacing of the discs.

6. An apparatus as claimed in claim 4, wherein at least the ends of the drum which concentrically surrounds the discs have diameters which decrease towards the end faces of the drum.

7. An apparatus as claimed in claim 4, wherein the drum which concentrically surrounds the discs takes the form of a cylinder of revolution.

* * * * *